(12) United States Patent
Feng et al.

(10) Patent No.: US 9,229,980 B2
(45) Date of Patent: Jan. 5, 2016

(54) COMPOSITION MODEL FOR CLOUD-HOSTED SERVING APPLICATIONS

(75) Inventors: Andrew An Feng, Cupertino, CA (US); Evgeniy Makeev, West Linn, OR (US); Jeffrey Budzinski, San Jose, CA (US); Swee Lim, Cupertino, CA (US); Scott Alexander Banachowski, Mountain View, CA (US); Raymond Paul Stata, Atherton, CA (US); Rohit Chandra, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 940 days.

(21) Appl. No.: 12/711,146

(22) Filed: Feb. 23, 2010

(65) Prior Publication Data
US 2011/0209007 A1     Aug. 25, 2011

(51) Int. Cl.
*G06F 9/46* (2006.01)
*G06F 17/30* (2006.01)
*G06F 11/07* (2006.01)

(52) U.S. Cl.
CPC ...... *G06F 17/30463* (2013.01); *G06F 11/0709* (2013.01); *G06F 11/0715* (2013.01); *G06F 11/0793* (2013.01)

(58) Field of Classification Search
None
See application file for complete search history.

(56) References Cited

U.S. PATENT DOCUMENTS

| | | | |
|---|---|---|---|
| 6,044,224 A * | 3/2000 | Radia et al. | 717/162 |
| 6,859,931 B1 * | 2/2005 | Cheyer et al. | 719/317 |
| 2006/0212593 A1 * | 9/2006 | Patrick et al. | 709/230 |
| 2008/0010251 A1 * | 1/2008 | Fontoura et al. | 707/3 |
| 2008/0256549 A1 * | 10/2008 | Liu et al. | 718/106 |

OTHER PUBLICATIONS

Hadoop avro, welcome to apache avro!, The Apache Software foundation, 2008, downloaded from http://hadoop.apache.org/avro/ on Feb. 23, 2010.
Amazon web services, Introducing Amazon Relational Database Service, downloaded from http://aws.amazon.com/ on Feb. 23, 2010.
Google app engine, welcome to Google App Engine, Run your web applications on Google's infrastructure, downloaded from https://www.google.com/accounts/ServiceLogin?service on Feb. 23, 2010.
Windows Azure Platform, downloaded from http://www.microsoft.com/windowsazure/ on Feb. 23, 2010.

* cited by examiner

*Primary Examiner* — Dong Kim
(74) *Attorney, Agent, or Firm* — Weaver Austin Villeneuve & Sampson LLP (57) ABSTRACT

Methods and apparatus for executing an application are disclosed. In accordance with one embodiment, a request is received. One or more of a plurality of module types are instantiated such that a plurality of module objects are generated. A query plan linking the plurality of module objects is executed such that a response to the request is generated. The response is then returned.

28 Claims, 7 Drawing Sheets

```
ResultCode
BranchModule::run(Context& context,
        BranchInterface& interface,           ──╱─402
        Branches& branches,
        size_t& selected)
{
        std::ostringstream oss;
        oss << name_ << " run";
        logDebugAndTrace(logger_, context, oss);

if (not interface.isSelectBranchValid()) {
                oss.str("");
                oss << name_ << " run"
                        << ", SelectBranch is not valid";
                logDebugAndTrace(logger_, context, oss);
                ResultCode rc = getExampleErrorCode(error::errorOne);
                interface.setError(Example::error::message(error::errorOne));
                return rc;
        } std::string branchName = interface.getSelectBranch();
        Branches::const_iterator found =
                std::find(branches.begin(), branches.end(), "horoscope");
        if (found != branches.end()) {
                selected = found - branches.begin();
        } else {
                oss.str("");
                oss << name_ << " run"
                        << ", cannot find matching branch for name=" << branchName;
                logDebugAndTrace(logger_, context, oss);
                ResultCode rc = getExampleErrorCode(error::errorOne);
                interface.setError(Example::error::message(error::errorOne));
                return rc;
        } oss.str("");
        oss << name_ << " run"
                << ", branch name=" << branchName
                << ", selected=" << selected;
        logDebugAndTrace(logger_, context, oss);
        return ResultCode();
}
```

FIG. 4A

```
BEGIN_INTERFACE(BranchInterface)
    IN_ARG(SelectBranch, std::string)
    OUT_ARG(Error, std::string)
END_INTERFACE
```

COMPOSITION MODEL FOR CLOUD-HOSTED SERVING APPLICATIONS

BACKGROUND OF THE INVENTION

The present invention relates generally to computer implemented execution of applications using query plans.

Companies typically dedicate enormous resources to implementing software applications. Often, companies dedicate a team of programmers to each application being implemented. Moreover, each team of programmers typically spends a great deal of time on designing and implementing a particular solution. A desire to create applications to take advantage of modern architectures such as the multi-core central processing unit (CPU) architecture make design and implementation of a solution even more complicated and technically challenging. As a result, the development of software applications is typically a costly endeavor.

SUMMARY OF THE INVENTION

Methods and apparatus for executing an application are disclosed. In one embodiment, an application such as a serving application may include one or more query plans. Each query plan may link a plurality of module objects. Therefore, an application may be executed by executing its corresponding query plans.

In accordance with one embodiment, a query plan linking a plurality of module objects is generated by instantiating one or more of a plurality of module types, wherein the plurality of module types includes a request module type and a response module type. A request is received. The query plan linking the plurality of module objects is executed such that a response to the request is generated. The response is then returned.

In another embodiment, a plurality of query plans are generated. For example, each of the query plans may be associated with a particular service or server. When a request is received, one of the query plans may be selected to process the request. The selection of a query plan may be based upon a variety of factors, including a service identified in the request.

The module types may include a request module type, a response module type, a basic module type, an asynchronous module type, a branch module type, a multibranch module type, a fork module type, a join module type, and/or a termination module type. In accordance with one embodiment, an instance of the request module type obtains information from the request (e.g., via deserialization) and the response is formed by an instance of the response module type using the obtained information (e.g., via serialization). Each of the module types may comprise a set of computer-readable instructions.

In accordance with one aspect, a system includes means for instantiating one or more query plans such that each of the query plans links a corresponding plurality of module objects, means for instantiating one or more of a plurality of module types such that a plurality of module objects are generated, means for receiving a request, means for executing one of the query plans linking a corresponding plurality of module objects such that a response to the request is generated; and means for returning the response. The system may further include means for identifying one of the query plans to execute in order to generate a response to a particular request.

The system may also provide multi-threaded capabilities via a horizontal container. The horizontal container may also have the capability of receiving a request (e.g, in accordance with a particular protocol), as well as forming a response (e.g., in accordance with a particular protocol). The horizontal container may receive the request from an endpoint, and return the response to the endpoint from which the request was received. The horizontal container may be implemented via a set of computer-readable instructions.

The system may also include vertical middleware responsible for loading (e.g., instantiating) query plans and selecting an appropriate query plan to process a request. The vertical middleware may therefore include one or more query plans that have previously been loaded. The vertical middleware may comprise a set of computer-readable instructions.

The system may further comprise a cloud that includes a pool of centrally managed hardware. Centralized management and provisioning of the hardware may provide for dynamic, on-demand provisioning to match the needs of a particular application. The cloud may include a plurality of servers, as well as other hardware such as storage devices.

In one embodiment, the cloud may communicate one or more endpoints in the cloud to the horizontal container. The horizontal container may communicate one or more endpoint definitions to the middleware, where the endpoint definitions are mapped to one or more endpoints in the cloud. Thus, the horizontal container may return a response to an endpoint from which a request was previously received by identifying the endpoint mapped to a particular endpoint definition provided by the middleware.

In accordance with one embodiment, a system includes a plurality of module types, vertical middleware, and a horizontal container. The vertical middleware may be configured to instantiate one or more of the plurality of module types such that a plurality of module objects are generated for each query plan, identify a query plan to generate a response to a request, and execute the identified query plan linking a plurality of module objects. The horizontal container may be configured to receive a request (e.g., from a cloud) and forward the request to the middleware, as well as be configured to receive a response from the middleware and return the response (e.g., to the cloud).

In another embodiment, the invention pertains to one or more devices, each comprising a processor and a memory. The processor(s) and/or memories may be configured to perform one or more of the above described method operations. In another embodiment, the invention pertains to a computer readable storage medium having computer program instructions stored thereon that are arranged to perform one or more of the above described method operations.

In accordance with another embodiment, the module types, vertical middleware, and horizontal container may each be implemented via a corresponding set of computer-readable instructions. Thus, the module types, vertical middleware, and/or horizontal container may be implemented via one or more devices. More particularly, the devices may be devices in a cloud.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Systems such as serving systems often have many common design elements. The external entry point for any request is typically a web-server. Behind the server are typically a variety of different services that participate in the processing and serving of the request. These services are often performed via a front-end server, a clustered/partitioned set of data servers, etc. However, despite common design patterns between many systems, there is typically little sharing of the building blocks of these systems, with each team tending to build their own systems from scratch.

The disclosed embodiments support the use of reusable software components to implement various applications. More particularly, the disclosed embodiments may be used to implement a variety of serving systems, such as advertising and search systems. For instance, the disclosed embodiments may enable a request such as a search query or server request to be processed and a response to be returned using various reusable components. In this manner, various applications and algorithms for selecting and providing search results and/or one or more advertisements may be implemented in a more efficient manner. Accordingly, teams may be freed to focus on their particular application logic and capabilities.

The disclosed embodiments may be implemented using a variety of programming languages. In one embodiment, the disclosed embodiments are implemented using an object-oriented language such as C++. Thus, in the following description, the terms "module object" or "module" will be used to refer to an instance of a particular module type.

Figure 1:
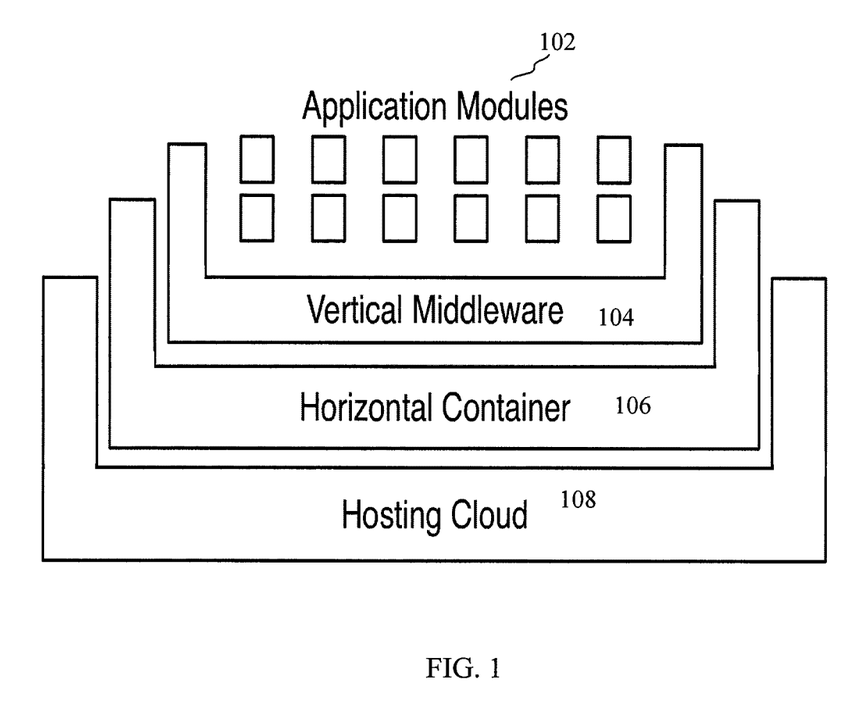
FIG. 1 is a block diagram illustrating an example system in which various embodiments may be implemented.

FIG. 1 is a diagram illustrating an example system in which the disclosed embodiments may be implemented. As shown at 102, a set of reusable software may be provided. More particularly, a plurality of module types may be established which may serve as building blocks for different applications. For instance, each of the plurality of module types may be a different class. When one of the plurality of module types is instantiated, an instance of the module type is generated. An instantiation of a module type may be referred to as a module object or module.

The system may also include vertical middleware 104. The middleware 104 may include software that executes one or more applications, which may each be composed of one or more query plans. Each query plan may include a plurality of module objects of various module types that are executed in a specified order. Each of the module objects may be one of a plurality of module types. More particularly, a query plan may include module objects of one or more module types. Moreover, a query plan may include one or more module objects of a single module type. Various module types will be described in further detail below.

The middleware 104 may load applications upon startup. More particularly, the middleware 104 may be responsible for instantiating a query plan and any corresponding module objects. In one embodiment, the module objects of the query plan may not be accessed by another query plan. Rather, each query plan may have a plurality of module objects that are dedicated to the query plan.

Upon receipt of a request, the middleware 104 may select an application or query plan to process the request. The middleware 104 may also be responsible for scheduling one or more query plans during execution.

The system may further include a horizontal container 106. The horizontal container 106 may include software that is responsible for receiving and propagating external client requests to the middleware 104, as well as propagating responses received from the middleware 104 to clients that initiated the requests. The horizontal container 106 may be implemented using various protocols via an abstract application programming interface (API) for a protocol driver plugin. The protocol implemented by the horizontal container 106 may provide a request/response capability. The horizontal container 106 may provide cluster (scatter-gather) network input/output (I/O), where one request may be sent to multiple partitions (e.g., servers) and the responses aggregated at the container 106 and returned to the client.

In addition, the horizontal container 106 may support multi-threaded functionality. More particularly, multiple distinct requests may be processed in parallel, where each of the requests may be processed within a single one of a plurality of threads or, in case of a fork or a multibranch module, multiple threads can be employed simultaneously in processing a single request. Generally, access to a module within a query plan is serialized. However, different concurrent requests executed by different threads may execute the same module simultaneously.

In one embodiment, information regarding the request may be provided as a context object that contains request data and additional metadata about the request. When the horizontal container 106 receives a request, the horizontal container 106 may provide the context object to the vertical middleware 104. The context object may then be passed as a parameter to and between modules during execution of a query plan.

In one embodiment, the system may include one or more APIs and/or hardware interfaces for exporting monitoring and metrics data. More particularly, an API may enable an application to define a monitoring event, generate a variety of monitoring and metrics data, and export the monitoring and metrics data to a receiving system for monitoring.

The system may be a serving system that is hosted within a cloud, referred to as hosting cloud 108. A cloud may include a pool of centrally managed hardware. Centralized management and provisioning of the hardware may provide for dynamic, on-demand provisioning to match the needs of a particular application. Thus, a cloud enables the provision of dynamically scalable resources. Often, a cloud will include a plurality of servers. At least one of the plurality of servers may function as a web server and/or search server. The resources may also be virtualized as a service over the Internet.

The container 106 may serve as an abstraction layer that supports communication between the hosting cloud 108 and the middleware 104. More particularly, the hosting cloud 108 may provision and/or modify endpoints within the cloud 108. For example, the endpoints may include one or more network devices such as servers. In order to enable the middleware 104 (and upper layers) to communicate with the endpoints, one or more abstract endpoints (i.e, endpoint definitions or named endpoints) may be provisioned and mapped to the endpoints in the cloud by the container 106 and/or the cloud 108. The container 106 may provide these abstract endpoints to the middleware, enabling the middleware 104 to communicate with endpoints in the cloud 108.

In one embodiment, one or more cloud serving engines in the cloud 108 may communicate with the container 106 to provision and/or modify endpoints. The container 106 may then provide corresponding abstract endpoints to the middleware 104, enabling the middleware to communicate with the abstract endpoints. This enables the cloud 108 to add, replace, remove, or otherwise modify endpoints without affecting the applications running in the middleware 104. Therefore, dynamic changes to the endpoints and/or corresponding abstract endpoints may be made while an application is running without impacting the application.

The horizontal container 106 and/or middleware 104 may be independent of communication protocols implemented in the cloud 108. Thus, applications may be written independently of communication protocols. Accordingly, applications that are written may be reusable and portable to other systems.

Figure 2:
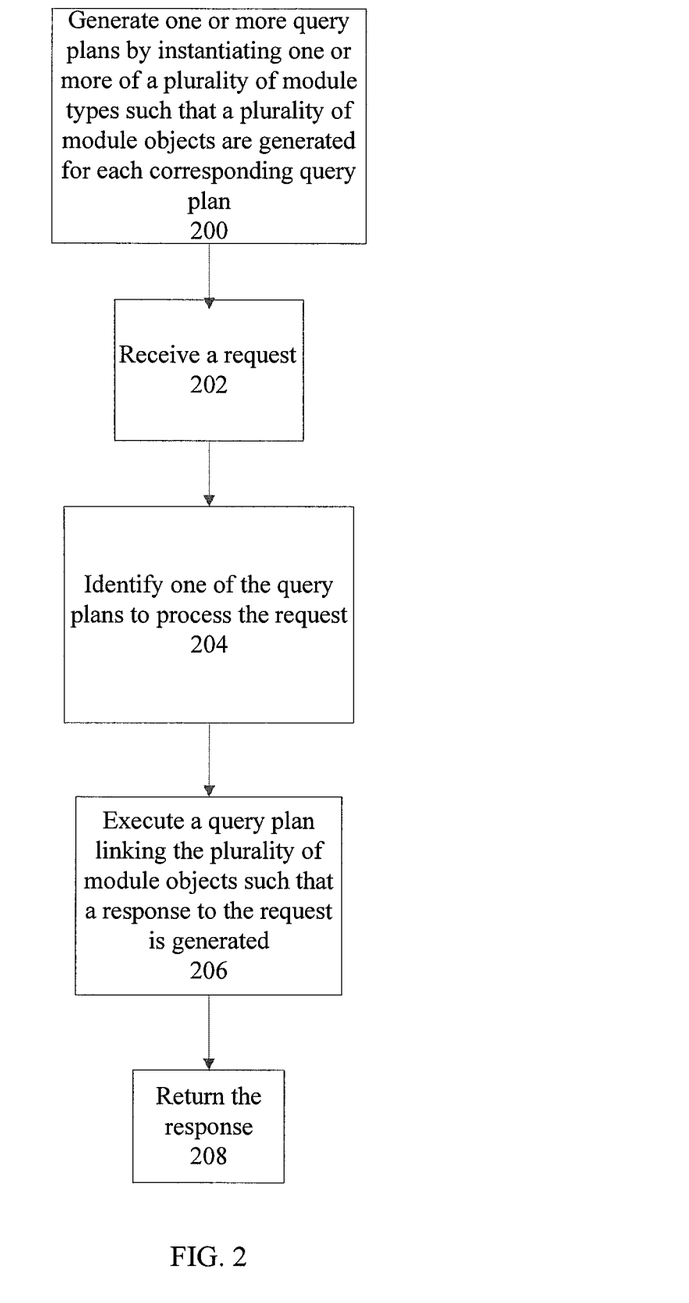
FIG. 2 is a process flow diagram illustrating a method of implementing an application.

FIG. 2 is a process flow diagram illustrating a method of implementing an application. A query plan and corresponding modules may be generated (e.g., instantiated) at start-up. In one embodiment, a plurality of query plans may be generated, where each of the query plans is dedicated to a particular server or service. In order to instantiate a query plan, one or more of a plurality of module types may be instantiated such that a plurality of module objects are generated as shown at 200. Once instantiated, a query plan linking the plurality of module objects may be executed to process one or more requests.

As shown at 202, a request may be received. For instance, the request may be received via a web server. Upon receiving the request, the middleware may identify a query plan to process the request at 204. This may be accomplished by identifying one of a plurality of query plans. More particularly, upon receipt of a request, the server or service being requested may be identified, enabling one of a plurality of query plans providing the requested server or service to be identified. The request may then be processed via the identified query plan. In this manner, requests directed to a particular server or requesting a particular service may be processed by a corresponding one of a plurality of query plans.

An attribute map may be generated in order to maintain values of attributes that are accessed and/or modified during a particular session for the request. The attribute map may be accessed and updated during the session to reflect current values of the attributes.

The identified query plan linking a plurality of module objects may be executed at 206 such that a response to the request is generated. More particularly, modules in a query plan are executed in the specified order until the query plan has completed execution or, alternatively, an error occurs. In one embodiment, when an error occurs, a terminate module is executed, as will be described in further detail below. The response may be returned to an initiator of the request at 208. For instance, the response may be returned via a web server.

A module may include one or more methods (e.g., functions or procedures). For example, a module may include a run( )method. In addition, the module may include data that is local to the module. The methods of a module and any corresponding attributes (e.g., input and/or output parameters) may be defined by an interface definition.

Interface Definition Language

Each module may be defined by an interface definition. More particularly, an interface definition for a module may declare one or more operations (e.g., methods) that the module will perform. In addition, the interface definition for a module may identify a set of one or more attributes that the module (e.g., a method of the module) will access. More particularly, the interface definition may identify the name of each of the attributes, the type of the attribute (e.g., integer, string, etc.), and/or whether the attribute functions as an input and/or output parameter. An example module and corresponding interface definition will be described in further detail below with reference to FIGS. 4A-4B. In one embodiment, a module can only access those attributes specified in its interface definition. Therefore, input and output dependencies of modules within a query plan may be validated from the corresponding interface declarations. This validation may be performed when a query plan is initially loaded or generated.

Since each query plan communicates with a module via its interface definition, the internal functionality of a module may be modified without impacting a query plan calling the module. Moreover, since the operations implemented by a module and corresponding attributes are visible, a query plan may be easily composed without knowledge of the specific implementation details of the operations of the module.

Module Types

A plurality of module types may be supported. In order to generate a module of a particular module type, an instance of the module type is generated. Thus, instantiation of the various module types enables the module types to be reusable. Various examples of module types that may be implemented are described below.

Request: A request module may be responsible for processing a request (e.g., server request). For instance, the request module may perform de-serialization associated with the request or data received in association with the request (e.g., from a buffer). A query plan may include a single request module.

Response: A response module may be responsible for forming a response (e.g., server response). In addition, the response module may perform serialization of a response and provide the serialized response into a buffer for transport. Typically, there is only one response module in a query plan. However, some applications may include multiple response modules for forming multiple responses per query.

Basic: A basic module may be used for straight-line application logic that does not depend upon additional external services (e.g., web services). Basic modules may be executed from start to finish through a single call.

Asynchronous: An asynchronous module may be used to implement application logic that depends upon external services (e.g., web services). Within an asynchronous module, one or more network services may be invoked. As responses are received from these services by the horizontal container, corresponding callback methods may be invoked by the horizontal container. Thus, each asynchronous module may include a callback method that may be called by the horizontal container. When a callback method is invoked, the execution of the path in the query plan returns to the point after which the network service was invoked. This may be accomplished by passing the original request (or corresponding context object) along with a response received from the external service via the callback method.

Branch: A branch module may determine during runtime which one of two or more child modules to invoke next, thereby providing switch-like control flow behavior in the query plan.

Fork: A fork module may execute its child modules in parallel on multiple threads such that each of the child modules is executed on a separate one of the threads. Any module that is not a branch module and has more than one child module may be considered to be a fork module.

Multibranch: A multibranch module may be used to select one or more of a set of two or more branch modules, and to execute the sub-branches of each of the selected branch module(s) in parallel. A multibranch module may prevent specific branch module(s) from being executed. Similarly, a multibranch module may prevent one or more specific sub-branches from being executed.

Join: A join module may be used to synchronize modules executing simultaneously on independent execution paths. A join module may collect responses generated via the different paths. As each execution path completes, it may enter the join module. In one embodiment, only one thread per request runs in a join module at a time. By default, a join module may wait for all execution paths to complete before continuing to execute the next (non-parallel) module. However, a join module can decide whether to wait for additional execution paths to complete. In other words, the join module may decide not to wait for all execution paths to complete, and implicitly cancel all outstanding execution paths. A join module may occur after a fork module. Therefore, the join module may cancel one or more of the pending fork paths that have not yet completed executing.

Since a join module is invoked after multiple parallel paths of execution, a join module has an opportunity to resolve any conflicts that might have occurred due to multiple modules modifying the same attribute (e.g., output parameter/argument). As each execution path enters a join module, that join module may select the corresponding output value to keep for the attribute or choose not to keep the value for the attribute.

Termination: In the event of an error in the execution of any of the paths, a termination module may be executed. The execution of the termination module may enable an error response to be returned. The termination module may be of any type of module. In one embodiment, the termination module does not have any child modules.

Figure 3:
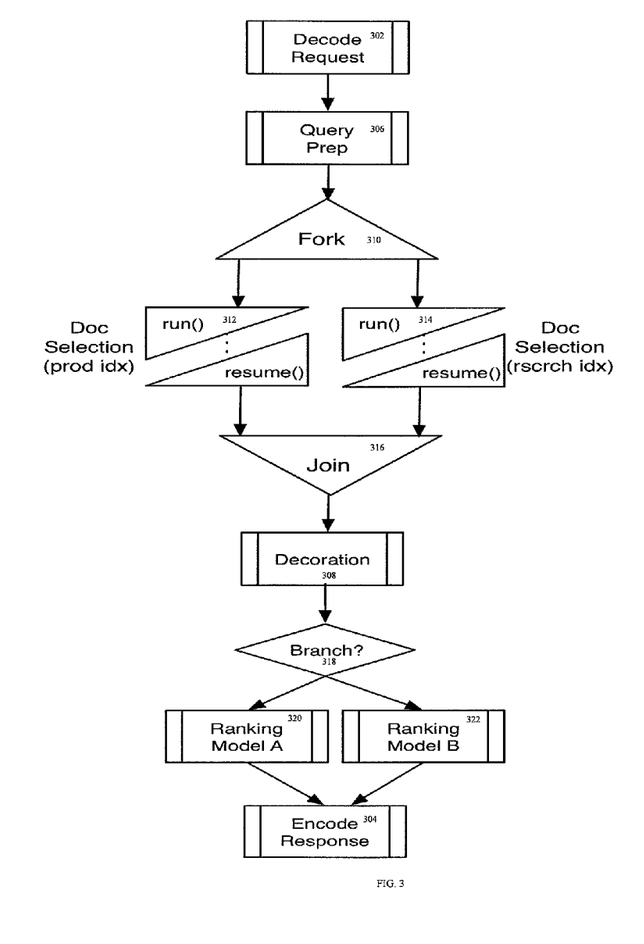
FIG. 3 is a diagram illustrating an example query plan that may be generated and executed in accordance with various embodiments.

FIG. 3 is a diagram illustrating an example query plan that may be generated and executed in accordance with various embodiments. A query plan may be represented by a tree data structure, where each node represents a different module object. In this example, the query plan is executed in a top-down manner (e.g., starting at the root node). Each "link" or branch in the tree may represent an order of execution, where the module represented by the upper node calls the module represented by the lower node. The first module that is executed in a query plan may be an instance of a request module type, referred to in this example as "Decode Request" 302. The last module that is executed in a query plan may be an instance of a response module type, referred to in this example as "Encode Response" 304. The modules "Query Prep" 306 and "Decoration" 308 are examples of a basic module.

Module 310 is an example of a fork module, which executes modules 312 and 314 in parallel on separate threads. Specifically, module 312 is an instance of a Doc Selection module with a parameter, prod idx, while module 314 is an instance of the Doc Selection module with a parameter, rscrch idx. Modules 312 and 314 are both asynchronous modules, which are executed via a run( )method, where a corresponding callback method resume( ) may be invoked by the horizontal container when a response is received from an external service.

Module 316 is an example of a join module, which may collect responses generated by module 312 and/or 314. Module 316 may cancel the execution of one of the modules 312 or 314 when the other module has completed execution.

Branch module 318 may determine during runtime whether to execute child module 320 or child module 322. In this example, child modules 320 and 322 implement two different ranking models, Ranking Model A and Ranking Model B, respectively.

Figure 4A:
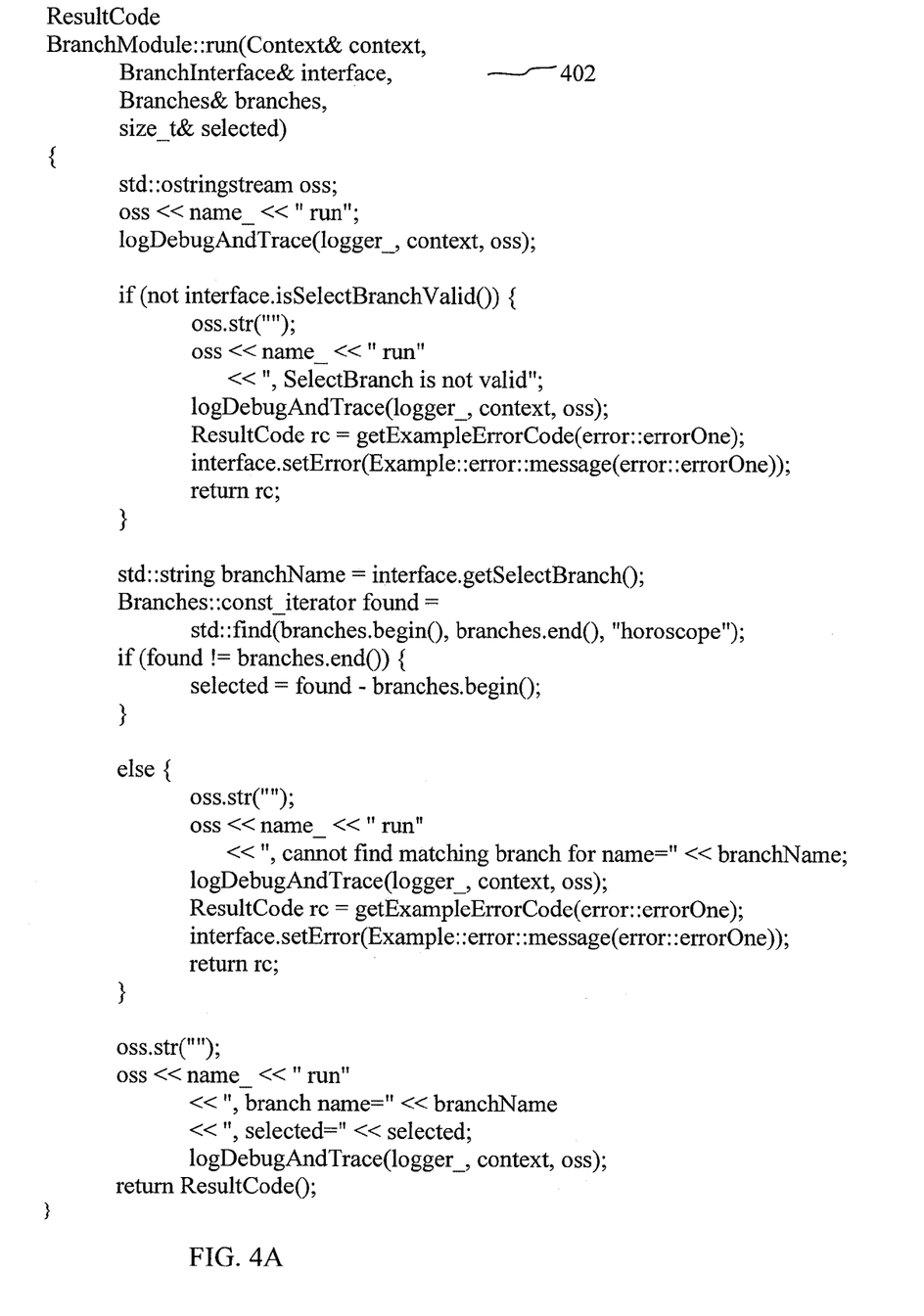
FIGS. 4A-4B are diagrams illustrating an example module and corresponding interface definition.
Figure 4B:
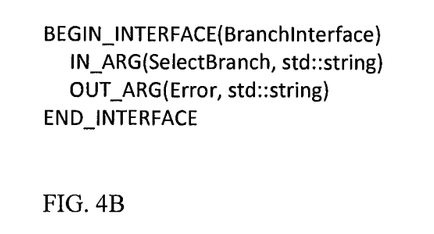

FIGS. 4A-4B together illustrate an example module and corresponding interface definition. More particularly, FIG. 4A illustrates an example branch module, while FIG. 4B illustrates an example interface definition that corresponds to the branch module shown in FIG. 4A. As shown in FIG. 4A, a branch module may include a "run" method. In this example, the signature 402 of the "run" method for the branch module type includes several parameters. More particularly, the method input parameters: a context object that includes information pertinent to the context of the request, a BranchInterface object for accessing an attribute map associated with the current request, and a set of branches that may be identified by name or label. "Run" method has an output parameter, "selected," which indicates one of the set of branches that has been selected by the branch module.

A corresponding interface definition for BranchInterface (shown as the second parameter of the "run" method of FIG. 4A) is shown in FIG. 4B. More particularly, the interface definition for Branch Interface indicates that the module will access two attributes, SelectBranch and Error. The SelectBranch attribute is an input attribute (indicated by IN_ARG), and has a value of data type string. The other attribute, Error, is an output attribute (indicated by OUT_ARG), and has a value of data type string. Input attributes allow read-only operations (such as isSelectBranchValid( ) and getSelectBranch( ) in FIG. 4A), and output attributes allow modification operations (such as setError( ) in FIG. 4A).

The disclosed embodiments may be implemented in a variety of systems and in a variety of contexts. For example, the disclosed embodiments may be used to implement ad serving. Upon receiving a request, one of a plurality of advertisements may be selected and returned via a response. As another example, the disclosed embodiments may be used to implement searching functionality. Thus, a response that is returned to the client may include search results. However, these examples are merely illustrative, and the disclosed embodiments may be used to implement a variety of systems for a variety of purposes.

Figure 5:
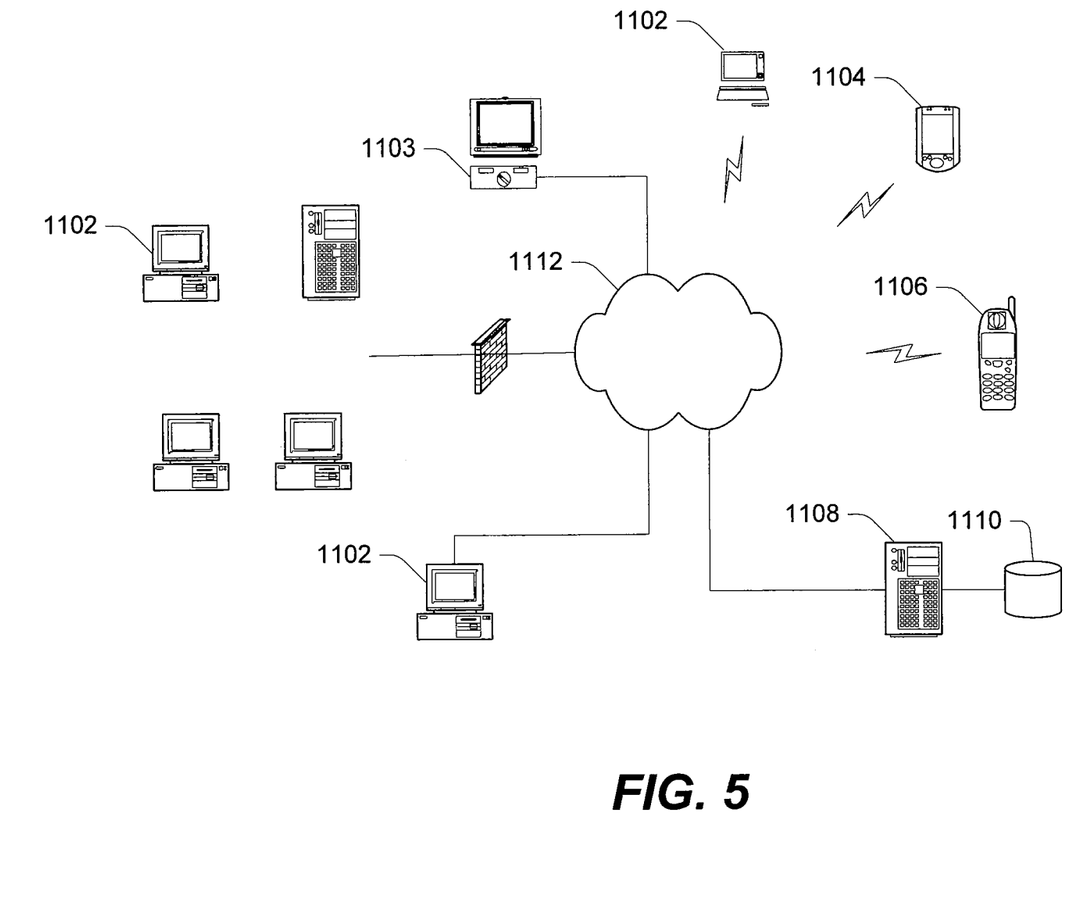
FIG. 5 is a simplified diagram of an example network environment in which various embodiments may be implemented.

The disclosed embodiments may be implemented in any of a wide variety of computing contexts. For example, as illustrated in FIG. 5, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform. Such devices may be referred to as clients.

And according to various embodiments, input that is processed in accordance with the invention may be obtained using a wide variety of techniques. For example, a query such as a search query may be obtained via a graphical user interface from a user's interaction with a local application, web site or web-based application or service and may be accomplished using any of a variety of well known mechanisms for obtaining information from a user. However, it should be understood that such methods of obtaining input from a user are merely examples and that a query such as a search query may be obtained in many other ways.

Responses such as search results and/or advertisements may be processed, selected and/or returned in response to a request according to the disclosed embodiments in some centralized manner. This is represented in FIG. 5 by server 1108 and data store 1110 which, as will be understood, may correspond to multiple distributed devices (e.g., one or more servers) and one or more data stores. The servers may include a search server and/or web server. The invention may also be practiced in a wide variety of network environments (represented by network 1112) including, for example, TCP/IP-based networks, telecommunications networks, wireless networks, etc. The network 1112 may take any suitable form, such as a wide area network or Internet and/or one or more local area networks (LAN's). The network 1112 may include any suitable number and type of devices, e.g., servers and/or storage devices, as well as routers and/or switches, for forwarding requests such as search or web object requests from each client to the application (e.g., search or web application) and for forwarding responses such as search or web results back to the requesting clients.

A query such as a search query may be processed or executed via one or more applications such as search applications (e.g., associated with a search server and/or web server) and/or one or more data sources. Embodiments of the present invention may be employed with respect to any application such as a search application. The application may be implemented by executing a query plan on any number of servers.

Embodiments disclosed herein may be implemented via one or more servers and/or clients. For example, various features may be implemented via a web browser and/or application on the clients. The disclosed embodiments may be implemented via software and/or hardware.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may include a portable device, such as a laptop or cell phone. The embodiments of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, as well as query plans, module types, modules, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
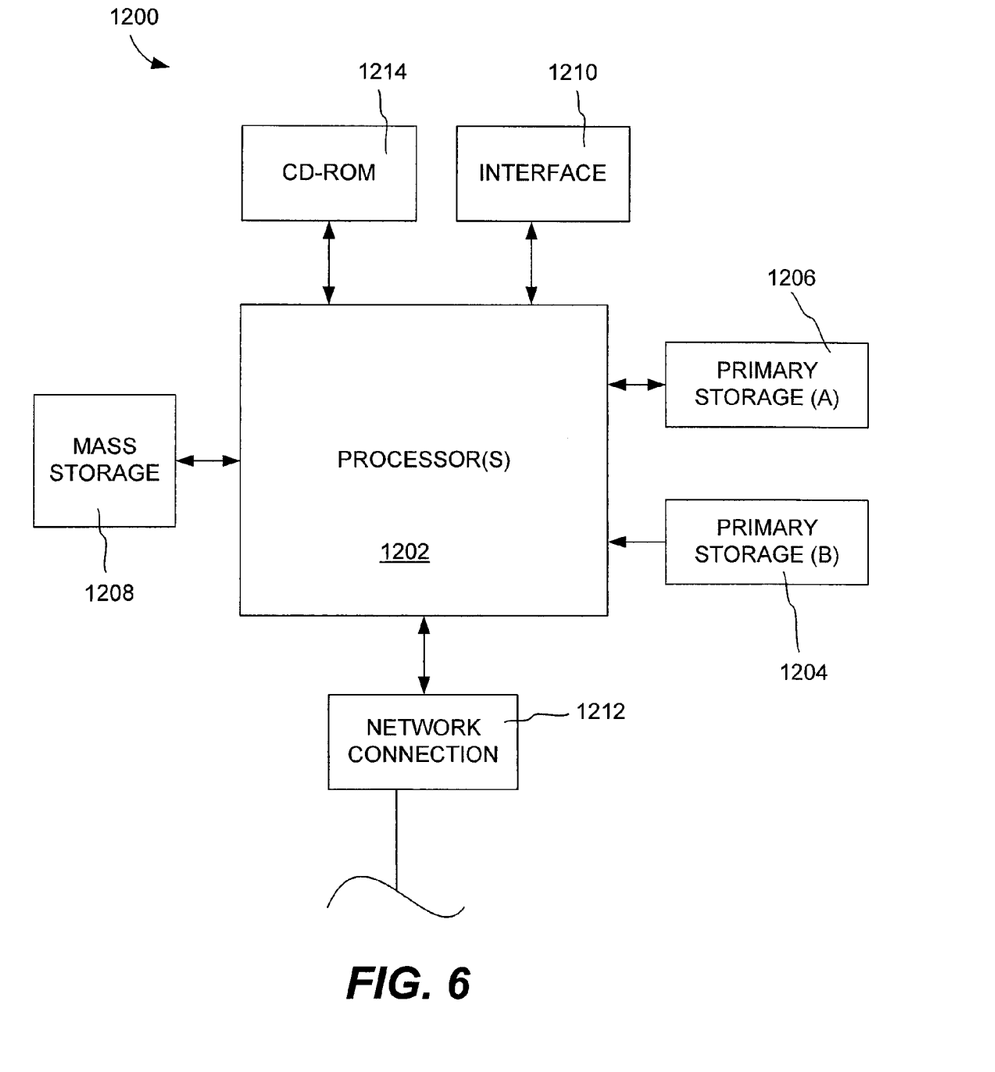
FIG. 6 illustrates an example computer system in which various embodiments may be implemented.

FIG. 6 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
instantiating a plurality of module types such that a plurality of module objects are generated, wherein the plurality of module types include a request module type and a response module type, wherein each of the plurality of module objects is defined by a corresponding interface definition, wherein the plurality of module types are different classes;
instantiating, by middleware, a query plan linking the plurality of module objects, wherein the plurality of module objects includes an instance of the request module type and an instance of the response module type;
receiving, at the middleware from a horizontal container, a request, wherein the horizontal container provides a context object to the middleware to be passed between the plurality of module objects during execution of the query plan;
receiving, at the middleware from the horizontal container, abstract endpoints corresponding to endpoints in a cloud;
executing, by the middleware, the query plan linking the plurality of module objects such that a response to the request is generated, wherein the instance of the request module type processes the request and wherein the response is formed by the instance of the response module type, wherein the middleware communicates with the endpoints in the cloud via the abstract endpoints; and
returning, by the middleware, the response to the horizontal container.

2. The method as recited in claim 1, wherein the plurality of module types further include an asynchronous module type such that the plurality of module objects include an asynchronous module, wherein the asynchronous module type invokes a network service, wherein the asynchronous module includes a callback method that is called by the horizontal container when a response is received from the network service.

3. The method as recited in claim 1, wherein the plurality of module types further includes a branch module type or a multibranch module type, wherein the branch module type determines one of two or more child modules to invoke, and wherein the multibranch module type selects one or more branch modules of two or more branch modules to invoke.

4. The method as recited in claim 1, wherein the plurality of module types further includes a fork module type whose child nodes are to be executed in parallel.

5. The method as recited in claim 1, wherein the plurality of module types further includes a join module type that performs synchronization for module objects executing simultaneously on independent execution paths, wherein the module objects are associated with different forks of a multi-branch module.

6. The method as recited in claim 1, wherein the plurality of module types further includes a termination module type that is executed when an error occurs during execution of the query plan.

7. The method as recited in claim 6, wherein the response is an error response.

8. The method as recited in claim 1, wherein the request is a search query.

9. The method as recited in claim 8, wherein the response includes search results.

10. The method as recited in claim 1, wherein the request initiates selection of one of a plurality of advertisements, and wherein the response includes a selected one of the plurality of advertisements.

11. The method as recited in claim 1, wherein the interface definition of each of the plurality of module objects declares one or more methods of the corresponding one of the plurality of module objects.

12. The method as recited in claim 1, wherein the interface definition of each of the plurality of module objects identifies one or more attributes that the corresponding one of the plurality of module objects accesses.

13. The method as recited in claim 1, wherein the query plan is executed via the interface definition of each of the plurality of module objects.

14. The method as recited in claim 1, wherein for each of the plurality of module objects, the interface definition is associated with a corresponding one of the plurality of module types.

15. A method, comprising:
generating, by middleware, one or more query plans by instantiating a plurality of module types such that a plurality of module objects are generated for each of the query plans, wherein the plurality of module types are different classes, wherein each of the plurality of module objects is defined by a corresponding interface definition;
receiving, at the middleware from a horizontal container, a request;
receiving, at the middleware from the horizontal container, abstract endpoints corresponding to endpoints in a cloud;
identifying, by the middleware, one of the query plans to process the request;
executing, by the middleware, the identified query plan such that a response to the request is generated, wherein the horizontal container provides a context object to the middleware to be passed between the plurality of module objects of the query plan during execution of the query plan, wherein the middleware communicates with the endpoints in the cloud via the abstract endpoints; and
returning, by the middleware to the horizontal container, the response.

16. The method as recited in claim 15, wherein the plurality of module types include at least one of a branch module type, a multibranch module type, a fork module type, a join module type, or a termination module type.

17. The method as recited in claim 15, further comprising:
validating input and output dependencies of the plurality of module objects within the query plan based upon the interface definition for each of the plurality of module objects.

18. The method as recited in claim 15, wherein the request is a search query.

19. The method as recited in claim 18, wherein the response includes search results.

20. The method as recited in claim 15, wherein the request initiates selection of one of a plurality of advertisements, and wherein the response includes a selected one of the plurality of advertisements.

21. The method as recited in claim 15, wherein the query plan is associated with a service being requested, wherein identifying one of the query plans to process the request comprises:
identifying a service associated with the request; and
identifying one of the query plans providing the service.

22. The method as recited in claim 15, wherein the request is received via a web server and the response is returned via the web server.

23. The method as recited in claim 15, wherein the request is one of a plurality of requests processed in parallel, wherein each of the plurality of requests is processed within one of a plurality of threads.

24. A system, comprising:
  means for instantiating, by middleware, one or more query plans such that each of the query plans links a corresponding plurality of module objects;
  means for instantiating a plurality of module types such that a plurality of module objects are generated, wherein each of the plurality of module objects is defined by a corresponding interface definition;
  means for receiving, by the middleware, a request from a horizontal container;
  means for receiving, by the middleware, abstract endpoints corresponding to endpoints in a cloud;
  means for executing, by the middleware, at least one of the query plans linking a corresponding plurality of module objects such that a response to the request is generated, wherein the horizontal container provides a context object to the middleware to be passed between the plurality of module objects during execution of the query plan, wherein the middleware communicates with the endpoints in the cloud via the abstract endpoints; and
  means for returning the response by the middleware to the horizontal container.

25. The system of claim 24, further comprising:
  means for identifying one of the query plans to execute in order to generate a response to a request.

26. The system of claim 24, wherein the plurality of module types include at least one of a branch module type, a multibranch module type, a fork module type, or a join module type, wherein the plurality of module types are different classes.

27. A system, comprising:
  one or more processors; and
  one or more memories, wherein the processors and the memories are configured to provide:
    middleware configured to generate one or more query plans by instantiating a plurality of module types such that a plurality of module objects are generated for each of the query plans, identify one of the query plans to generate a response to a request, and execute the identified query plan, wherein the plurality of module types are different classes, wherein each of the plurality of module objects is defined by a corresponding interface definition, wherein the identified query plan is executed using the interface definition of each of the plurality of module objects; and
    a container configured to receive a request and forward the request to the middleware, and configured to receive a response from the middleware and return the response, wherein the container provides a context object to the middleware to be passed between the plurality of module objects of a query plan during execution of the query plan;
  wherein the container is further configured to communicate abstract endpoints to the middleware, where the abstract endpoints are mapped to endpoints in a cloud;
  wherein the middleware is further configured to communicate with the abstract endpoints.

28. The system as recited in claim 27, wherein the system further comprises:
  a mechanism for communicating one or more endpoints in a cloud to the container.

* * * * *